(12) United States Patent
Villarreal et al.

(10) Patent No.: US 10,107,601 B2
(45) Date of Patent: Oct. 23, 2018

(54) ELECTRICALLY OPERATED PULSE INITIATORS AND IGNITION

(71) Applicant: Raytheon Company, Waltham, MA (US)

(72) Inventors: James Kendall Villarreal, Tucson, AZ (US); Mark T. Langhenry, Tucson, AZ (US); Matt H. Summers, Marana, AZ (US); Daniel V. Macinnis, Vail, AZ (US)

(73) Assignee: Raytheon Company, Waltham, MA (US)

( * ) Notice: Subject to any disclaimer, the term of this patent is extended or adjusted under 35 U.S.C. 154(b) by 275 days.

(21) Appl. No.: 14/875,741

(22) Filed: Oct. 6, 2015

(65) Prior Publication Data
US 2017/0097213 A1    Apr. 6, 2017

(51) Int. Cl.
| | | |
|---|---|---|
| *F02K 9/28* | (2006.01) | |
| *F42B 3/04* | (2006.01) | |
| *F02K 9/95* | (2006.01) | |

(52) U.S. Cl.
CPC .......... *F42B 3/04* (2013.01); *F02K 9/28* (2013.01); *F02K 9/95* (2013.01)

(58) Field of Classification Search
CPC ..... F42B 3/04; F02K 9/28; F02K 9/95; F02K 9/08; F02K 9/26; F02K 9/32; F02K 9/94
USPC ..... 102/202.5, 202.14, 202.11, 202.1–202.4, 102/202, 530; 244/171
See application file for complete search history.

(56) References Cited

U.S. PATENT DOCUMENTS

| | | | |
|---|---|---|---|
| 4,085,584 A | 4/1978 | Jones et al. | |
| 5,600,946 A | 2/1997 | Dombrowski et al. | |
| 6,877,435 B2* | 4/2005 | Daoud | B60R 21/2171 102/530 |
| 7,137,339 B2* | 11/2006 | Bierwirth | B60R 21/2644 102/202 |
| 8,141,492 B1* | 3/2012 | Ambs | F42B 5/16 102/430 |
| 8,397,486 B2* | 3/2013 | Mihara | F02K 9/12 102/287 |
| 8,950,329 B2 | 2/2015 | Villarreal et al. | |
| 2001/0013300 A1* | 8/2001 | Lutz | B60R 21/2644 102/530 |
| 2008/0134924 A1* | 6/2008 | Sawka | C06B 45/00 102/291 |
| 2009/0031912 A1* | 2/2009 | Gilbert | F41A 1/08 102/437 |
| 2009/0212163 A1* | 8/2009 | Shi | F02K 9/28 244/171.1 |
| 2012/0311993 A1 | 12/2012 | Mihara et al. | |
| 2013/0305952 A1* | 11/2013 | Fukumoto | C06B 33/06 102/530 |

(Continued)

*Primary Examiner* — John Cooper
(74) *Attorney, Agent, or Firm* — Renner, Otto, Boisselle & Sklar, LLP (57) ABSTRACT

A gas generation system for generating gases, such as for use as or as part of a rocket motor in propelling a projectile, includes two or more propellant charges and electrically operated propellant initiators operatively coupled to respective of the propellant charges, to initiate combustion in the propellant charges, wherein the propellant charges are operatively isolated from one another such that the propellant charges can be individually initiated and are not ignited due to gases generated from other of the propellant charges being combusted.

19 Claims, 6 Drawing Sheets

(56) References Cited

U.S. PATENT DOCUMENTS

2014/0174313 A1* 6/2014 Villarreal ................. F02K 9/94
102/530

* cited by examiner

ELECTRICALLY OPERATED PULSE INITIATORS AND IGNITION

FIELD OF THE INVENTION

The invention relates generally to electrically operated propellants and gas generation systems for propelling a projectile, such as a munition.

DESCRIPTION OF THE RELATED ART

Multiple pulse propulsion systems are useful for projectiles, such as missiles, smart bombs, etc. The inclusion of multiple pulses allow for non-continuous propulsion, different propulsion forces, and even backup pulses without the need for complete separate stages. The propellant charges for the separate pulses are often separated by an inert barrier to prevent subsequent pulses from igniting due to contact with combustion gases formed from another propellant charge. Typically, once a propellant charge is ignited, the force of the combustion gases produced will break through an inert barrier, expelling thrust gases from the projectile until the propellant of the pulse burns completely out. An igniter is used to ignite the propellant. In some systems, such as pulsed propulsion systems or gas generators, more than one igniter is required with at least one igniter per pulse, and possibly more than one igniter per pulse for redundancy.

An inert barrier does not add to the total impulse of the motor and does not contribute to the propulsion. Instead, an inert barrier often adds weight to the projectile and takes up volume that could otherwise be used for storing propellant. Use of an inert barrier may also add difficulty to the assembly and manufacturing of the associated projectile or motor.

SUMMARY OF THE INVENTION

The present invention addresses many of the challenges of a typical multiple pulse propulsion system, such as a multiple pulse motor. A gas generation system is provided for use as a propulsion system of a projectile. The gas generation system includes non-inert initiators that are ignitable for causing subsequent ignition of a proximate propellant charge while contributing to total thrust of the respective pulse. The gas generation system therefore is more efficient in its use of weight and volume of thrust-providing materials. The non-inert propellant barriers are made from an electrically operated propellant and are themselves used as an igniter. This reduces or altogether eliminates the need for igniters for igniting the associated propellant charges.

An exemplary gas generation system includes two or more propellant charges, and electrically operated propellant initiators operatively coupled to respective of the propellant charges, to initiate combustion in the propellant charges, wherein the propellant charges are operatively isolated from one another such that the propellant charges can be individually initiated.

The electrically operated propellant initiators may have electrically operated propellant that is configured to transition from an unignited state to an ignited state when electrical input is applied across the respective one of the electrically operated propellant initiators and is configured to maintain the unignited state when the electrical input is not applied.

The electrically operated propellant of the electrically operated propellant initiators may be configured to transition from the ignited state to the unignited state when exposed to pressure greater than 200 psi and the electrical input is not applied.

At least one electrically operated propellant initiator may be positioned proximate a respective one of the two or more propellant charges to initiate combustion of the respective propellant charge.

Each of the electrically operated propellant initiators may have a pair of electrodes, and the respective electrically operated propellant is disposed between the respective pair of electrodes.

The electrodes of at least one initiator may be mesh electrodes.

The gas generation system may further include one or more power sources and a pair of leads extending from the one or more power sources to each of the electrically operated propellant initiators.

For at least one pair of electrodes of the electrically operated propellant initiators, one electrode of the respective pair of electrodes may provide a greater current density than the other electrode of the respective pair of electrodes.

A portion of the electrically operated propellant of at least one of the electrically operated propellant initiators may not be disposed between the respective pair of electrodes such that all of the electrically operated propellant does not ignite when an electrical input is applied across the respective pair of electrodes.

All of the electrically operated propellant of at least one of the electrically operated propellant initiators may be disposed between the respective pair of electrodes, such that a first electrode of the respective pair of electrodes is disposed against a first side of the electrically operated propellant and a second electrode of the respective pair of electrodes is disposed against a second side of the electrically operated propellant opposing the first side of the electrically operated propellant.

There may be a projectile including the gas generation system for driving movement of the projectile.

Another exemplary gas generation system includes a casing extending between a closed end and an open end having an opening to allow escape of gases, a primary propellant charge and one or more auxiliary propellant charges each disposed in the casing, a primary initiator disposed in the casing and positioned proximate the initial propellant charge for initiating combustion of the primary propellant charge, and one or more auxiliary initiators disposed in the casing and positioned proximate the one or more auxiliary propellant charges for initiating combustion of the one or more auxiliary propellant charges. The primary and auxiliary initiators include an electrically operated propellant that is configured to transition from an unignited state to an ignited state when a respective electrical input is applied across the respective one of the initiators, and the electrically operated propellant is configured to maintain the unignited state when the electrical input is not applied.

At least one auxiliary initiator of the one or more auxiliary initiators may be positioned to fluidly separate within the casing at least one auxiliary propellant charge of the one or more auxiliary propellant charges from the opening, the primary initiator, and the primary propellant charge.

The electrically operated propellant of the primary and auxiliary initiators may be configured to transition from the ignited state to the unignited state when exposed to pressure greater than 200 psi and the respective electrical input is not applied.

The primary initiator may be positioned to fluidly separate within the casing the primary propellant charge from the opening.

A projectile may include the gas generation system for driving movement of the projectile, wherein a body of the projectile includes the casing.

There may be a method of propelling a projectile, where the projectile includes two or more propellant charges and electrically operated propellant initiators operatively coupled to respective of the propellant charges to initiate combustion in the propellant charges, where the propellant charges are operatively isolated from one another such that the propellant charges can be individually initiated. The method includes the steps of: providing a first propulsion pulse by applying an electrical input across one of the electrically operated propellant initiators to initiate combustion of one of the propellant charges; maintaining isolation of other of the propellant charges during the initiation of combustion of the one of the propellant charges; and providing a second propulsion pulse by applying an electrical input across another of the electrically operated propellant initiators to initiate combustion of another of the propellant charges.

The projectile may include at least three propellant charges and the method may further include the step of maintaining isolation of other of the propellant charges during the initiation of combustion of the another of the propellant charges.

The method may further include the step of applying electrical input across the one or the another electrically operated propellant initiator in a direction from a first electrode to a second electrode, the first and second electrodes being coupled between a power source and the respective initiator, and one of the first and second electrodes providing a greater current density than the other of the first and second electrodes.

The method may further include the step of extinguishing the one or the another electrically operated propellant initiator via stopping the application of electrical current across the respective initiator.

The method may further include the step of applying electrical input across the one or the another electrically operated propellant initiator in a direction from a first electrode to a second electrode, the first and second electrodes being coupled between a power source and the respective initiator, and the first electrode providing a greater current density than the second electrode.

The method may further include the step of applying electrical input across the one or the another electrically operated propellant initiator in a direction from a second electrode to a first electrode, the first and second electrodes being coupled between a power source and the respective initiator, and the first electrode providing a greater current density than the second electrode. The method may further include the step of only igniting less than 75% of the one or the another electrically operated propellant initiator to produce the respective propulsion pulse.

The method may further include the step of using a single power source to provide the electrical input for the ignition of each of the electrically operated propellant initiators.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The annexed drawings, which are not necessarily to scale, show various aspects of the disclosure.

DETAILED DESCRIPTION

The present invention provides a gas generation system for generating combustion gases, such as for purposes of propelling a munition, and for example a projectile. The gas generation system is configured to provide more than one gas propulsion pulse, and thus all included propellant charges may not be burned simultaneously. It will of course be appreciated that the gas generation system may be used to provide propulsion for any projectile. For example, the gas generation system may be used as, or as part of, a rocket motor of a missile, a bomb, a smart bomb, a supply container etc. The gas generation system may alternatively be used for other purposes, such as to drive a turbine, to operate a pressure driven mechanical device, to provide tank gas pressurization, etc.

An exemplary gas generation system is constructed to be used as a rocket motor, but may of course be used for other gas generation purposes in other embodiments. The rocket motor is configured for isolating propellant charges from one another such that the propellant charges can be individually initiated. The rocket motor is further configured to provide thrust from ignition of initiators isolating the propellant charges. The rocket motor is also configured to initiate pulses via use of electrical inputs without the use of typical igniters. For example, the initiators may be made of an electrically operated propellant, to be further discussed.

Figure 1:
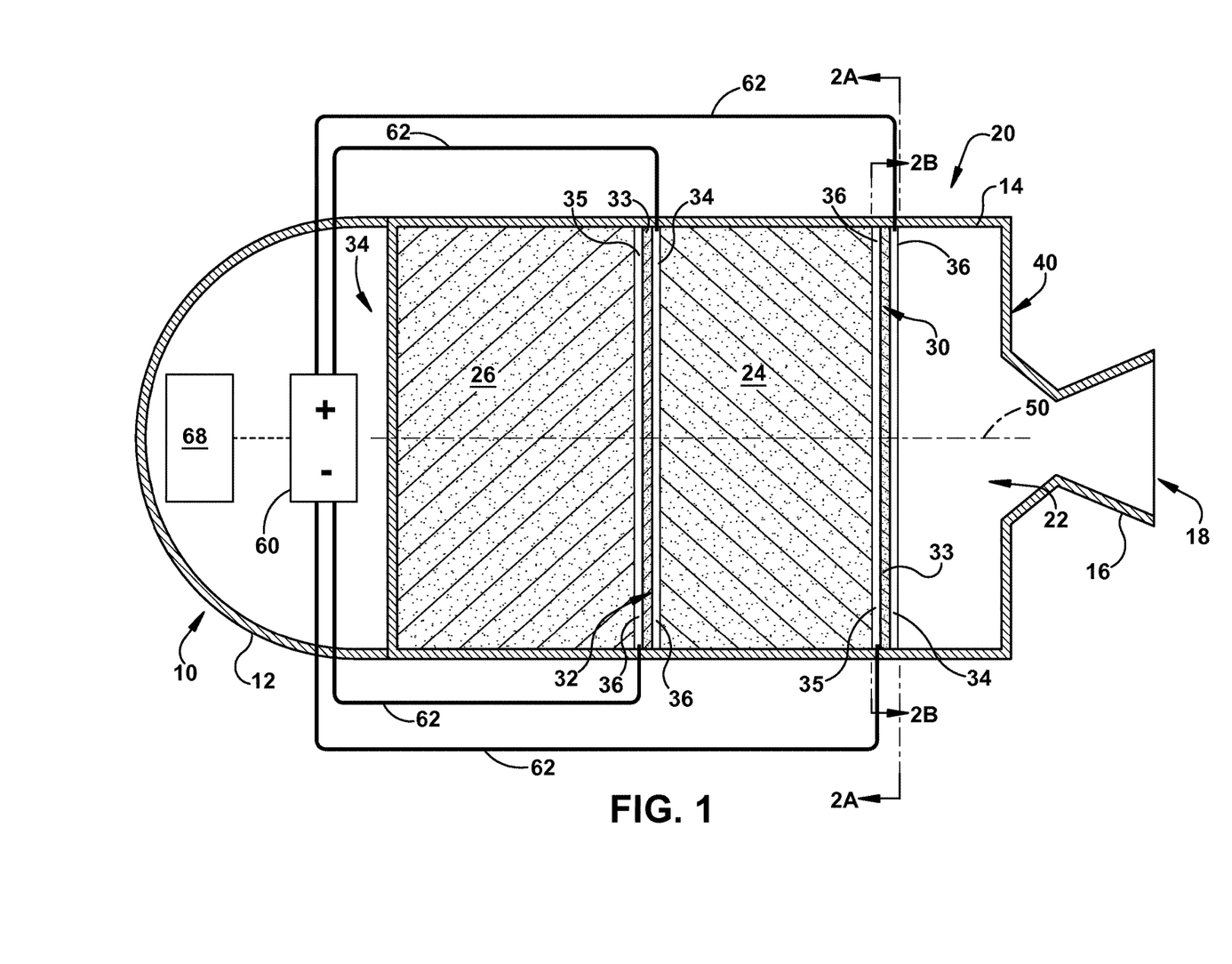
FIG. 1 is a schematic view of a projectile having a gas generation system in accordance with the invention.

Turning now to FIG. 1, a projectile 10 is shown in schematic view and has a rocket motor 20. The rocket motor 20 is provided for generating gases to drive movement of the projectile 10. The projectile 10 includes a body 12 that includes a casing 14 of the rocket motor 20. The body 12 further includes a nozzle 16 having a nozzle opening 18 adjacent an opening 22 of the casing 14, for directing propellant gases generated from the rocket motor 20.

The rocket motor 20 includes the casing 14, two propellant charges 24 and 26, and two initiators 30 and 32 for initiating the propellant charges 24 and 26 to produce thrust. The initiators 30 and 32 are configured to enable isolated initiation of the propellant charges 24 and 26 to provide pulses that may be fired separately from one another.

The casing 14 extends between a closed end 39 and an open end 40 having the opening 22 for allowing expulsion of combustion gases from the casing interior. The casing 14 may have any suitable shape, for example a cylindrical shape that is useful in a projectile application. The casing 14 may be made from any suitable material for containing burning combustion gases at high pressures and high temperatures. For example the casing may be made from an inert material that is not ignitable during normal use of the rocket motor 20.

The propellant charges 24 and 26 are provided for being ignited and combusted to generate high pressure gases for being used to propel or move an object or pressurize a container, for example. The propellant charges 24 and 26 are depicted as solid, single piece charges, though may be provided in any shape or form, not limited to rods, pellets, grain, etc. The propellant charges 24 and 26 may be made from any suitable material or materials, including fuels, oxidizers, binders, plasticizers, metallic additives, etc. Each of the propellant charges 24 and 26 may be made of different materials, have different form, or have different shape than the other propellant charge. As shown two propellant charges 24 and 26 are included, though any number of propellant charges, two or more, may be included in the rocket motor 20. While the two propellant charges 24 and 26 are shown as being isolated from one another, additional charges may or may not be separately isolated.

The depicted propellant charges 24 and 26 are isolated from one another via one initiator 30 of the two initiators 30 and 32. The initiators 30 and 32 are operatively coupled to respective of the propellant charges 24 and 26, to initiate combustion in the propellant charges 24 and 26. As used herein, coupling may include direct coupling, such as via an initiator 30 or 32 being contiguous with a respective propellant charge 24 or 26, or indirect coupling, such as where a spacing element, such as an electrode, is present between an initiator 30 or 32 and a respective propellant charge 24 or 26. An additional or alternative spacing element may include a support, a spacer, etc. In addition to isolation provided via the initiators, in other embodiments one or more propellant charges may be isolated from other propellant charges via a casing wall or another inert material that is not ignitable during normal use of the rocket motor 20.

Initiation, such as ignition, of an initiator 30 or 32 will generate heat great enough to in turn ignite a respective propellant charge 24 or 26. It will of course be appreciated that whether directly or indirectly coupled to the respective propellant charge 24 or 26, a respective initiator 30 or 32 must be proximate the respective propellant charge 24 or 26. As used herein, proximate refers to a distance that is sufficiently close to the respective propellant charge 24 or 26 such that ignition of the initiator 30 or 32 causes subsequent ignition and combustion of the propellant charge 24 or 26.

The depicted primary initiator 30 is shown as positioned proximate, and in particular contiguous with, the primary propellant charge 24. The primary propellant charge 24 is fluidly separated from the opening 22 of the casing 14 by the primary initiator 30. The depicted primary initiator 30 extends radially outwardly from a center longitudinal axis 50 of the casing 14 to seal against the inner surface of the casing 14. In this way, the initiator 30 serves as a barrier between the primary propellant charge 24 and an environment external to the rocket motor 20, while also providing structural support to retain the primary propellant charge 24 in the casing 14, such as in a case where the propellant charge 24 includes pellets.

In other embodiments, the primary initiator 30 may not fully fluidly separate the primary propellant charge 24 from the opening 22. In such case, the primary initiator 30 may be disposed within a cavity of or embedded in the primary propellant charge 24.

The depicted auxiliary initiator 32 is generally positioned to operatively isolate the propellant charges 24 and 26 from one another. For example, the auxiliary initiator 32 is shown as positioned proximate, and in particular contiguous with, the auxiliary propellant charge 26. The auxiliary initiator 32 is positioned to fluidly separate the auxiliary propellant charge 26 from the primary initiator 30 and the primary propellant charge 24. In this way the initiator 32 serves as a barrier between the propellant charges 24 and 26, while also providing structural support for the auxiliary propellant charge 26. The auxiliary propellant charge 26 is isolated by the auxiliary initiator 32 from heat created and gases formed from the ignition and combustion of other propellant charges and initiators other than the auxiliary initiator 32. The auxiliary propellant charge 26 is also fluidly separated from the opening 22 of the casing 14 by the auxiliary initiator 32, and by the primary initiator 30.

While the auxiliary initiator 32 is positioned proximate the auxiliary propellant charge 26 for initiating combustion of the charge 26, the auxiliary initiator 32 may be positioned to also initiate combustion of one or more other propellant charges. For example, the auxiliary initiator 32 may be positioned between two auxiliary propellant charges 26. Alternatively, while the auxiliary initiator 32 extends radially outwardly from the center longitudinal axis 50 to contact the inner surface of the casing 14, in other embodiments the auxiliary initiator 32 may have any other suitable shape.

In the depicted embodiment, the initiators 30 and 32 may have a circular shape to fit within the cylindrical casing 14. This circular shape is provided in the form of thin sheets of material. The thin sheets are of sufficient thickness to account for degradation of a surface of the respective initiator 30 or 32 when not ignited but still exposed to high heat in the casing 14. For example, combustion of the depicted primary propellant charge 24 may cause high heat in the casing 14, which will not ignite the electrically operated propellant of the auxiliary initiator 32 when an electrical input is not applied across the auxiliary initiator 32. Nonetheless, a sacrificial portion, such as a thin portion, of the auxiliary initiator 32 exposed to the high heat may degrade. It should be noted that in other embodiments, the initiators 30 and 32 may have any suitable shape to provide operative isolation of the propellant charges 24 and 26 from one another.

Each of the initiators 30 and 32 includes an electrically operated propellant 33 and corresponding electrodes 34 and 35 of a respective pair of electrodes 36. The electrically operated propellant 33, and thus the initiators 30 and 32, is configured (a) to ignite in response to an electrical input and (b) to generate gas when ignited. The electrically operated propellant 33 is configured to transition from an unignited state to an ignited state when a respective electrical input is applied across the respective one of the initiators 30 and 32 between the respective pair of electrodes 36. The electrically operated propellant 33 is also configured to maintain the unignited state when the electrical input is not applied. Further, the electrically operated propellant 33 is configured to transition from the ignited state to the unignited state when exposed to pressure less than a threshold, such as 200 psi, and the respective electrical input is not being applied.

One exemplary electrically operated propellant is described in U.S. Pat. No. 8,950,329, assigned to Raytheon Company of Waltham, Mass., USA, which is herein incorporated in its entirety by reference. The exemplary electrically operated propellant ignites with the application of electricity and correspondingly extinguishes with the cessation of electricity, even when exposed to high pressures, though below a high pressure threshold. For example, when exposed to ambient or high pressures within the casing 14, such as atmospheric pressure, pressures greater than 200 psi, 500 psi, 1000 psi, 1500 psi and up to 2000 psi, the electrically operated propellant is extinguished with the interruption of electricity (e.g., voltage or current) applied across the electrically operated propellant. In other words, without application of electricity, the combustion of the electrically operated propellant is not self-sustaining at high pressures, such as high pressures of 200 psi or more and less than 2000 psi. Thus, the electrically operated propellant is configured for "on" and "off" operation under the described variety of conditions.

One example is an electrically operated propellant having a plurality of components including, but not limited to, an oxidizer, a fuel, and a binder. The electrically operated propellant may comprise approximately 50 to 90 percent by mass of an oxidizer, such as a liquid perchlorate based oxidizer. The liquid perchlorate based oxidizer may include but is not limited to perchlorate based oxidizers such as aluminum perchlorate, barium perchlorate, calcium perchlorate, lithium perchlorate, magnesium perchlorate, perchlorate acid, strontium perchlorate, sodium perchlorate and the like. The preceding list is not intended to be limiting but merely provides examples for use with the electrically operated propellant.

The electrically operated propellant may comprise approximately 5 to 30 percent by mass of fuel. In one example, the fuel includes but is not limited to a metal based fuel. The metal based fuel assists in the ignition and extinguishing of the electrically operated propellant. For instance, the provision of a metal based fuel increases the conductance of the electrically operated propellant and thereby facilitates the application of electricity to the electrically operated propellant for ignition. Conversely, the metal based fuel retards combustion of the electrically operated propellant because of the low flammability of the metal. Accordingly, the metal based fuel retards combustion of the electrically operated propellant and facilitates its extinguishing upon interruption of electricity. The metal based fuel may include, but is not limited to, tungsten, magnesium, copper oxide, copper, titanium and aluminum. The preceding list is not intended to be limiting but merely provides examples for use with the electrically operated propellant.

The binder in one example comprises the remainder of the mass percentage of the electrically operated propellant. In one example, the binder includes but is not limited to casein, methyl cellulose, polyethylene oxide, polyvinyl acetate, polyvinyl alcohol or the like. The binder in one example cooperates with the oxidizer and the fuel to combine these components into a solid fuel propellant shapeable into varying configurations. For example the electrically operated propellant may have the shape of a thin sheet having a cylindrical configuration, as depicted in FIG. 1 (electrically operated propellant 33).

The electrically operated propellant is able to maintain its shape when exposed to dynamic kinematic conditions, for instance when used as part of a rocket motor of a projectile. In one example, the electrically operated propellant has a storage modulus of 300 psi or greater at room temperature. This allows the electrically operated propellant to maintain its shape through dynamic conditions including, but not limited to, pressurization, launch and flight. As a result, the electrically operated propellant is formable (e.g., can be cast or molded) into any number of grain configurations. As another result, an electrically operated propellant with a consistent shape maintains a predictable performance profile because the shape and surface area of the electrically operated propellant are relatively static during operation. Deformation phenomena such as slumping, flattening or cracking of the electrically operated propellant are substantially reduced or even avoided. Consequently, the burn rate and other performance characteristics are predictably maintained throughout the operation of the rocket motor 20. Example performance characteristics with relation to use of the rocket motor 20 in a projectile include total impulse value, ignition rise time, peak pressure, weight propellant density, and the like.

These performance characteristics are able to be maintained throughout a prolonged storage period of the electrically operated propellant. For example, in one example, one or more of the rocket motors 20 are often stored within enclosed spaces such as crates for extended periods of time such as months, years or the like. Often these systems are stored in areas that are not well ventilated and are subject to heat approaching 140 degrees Fahrenheit. Nonetheless, the use of the liquid perchlorate based oxidizer, as well as the metal based fuel in at least some examples, assists the electrically operated propellant in maintaining its performance characteristics in such condition even over prolonged storage times.

The electrically operated propellant is configured to minimize a power source supplying the necessary electrical input by requiring a small input to ignite and sustain burning. For example, the electrically operated propellant has a small specific energy of approximately 50 to 1100 joules per gram, such as 300 joules per gram. In another example, the electrically operated propellant has a small specific energy of approximately 600 to 1100 joules per gram, such as 800 joules per gram. As a result, a small power source is needed to supply the electrical input. The same power source may be used to provide electrical input to each of the initiators 30 and 32 in the depicted embodiment.

As shown in FIG. 1, a power source 60 is provided to generate the electrical input for igniting the initiators 30 and 32, while a pair of leads 62 electrically couple each of the initiators 30 and 32 to the power source 60. The leads 62 extend between the respective initiators 30 and 32 and the power source 60, which may be a battery or any other suitable device capable of generating electrical input. The leads 62 may be wires, such as insulated wires having materials capable of withstanding the high heat generated in the rocket motor 20. In other embodiments, more than one power source 60 may be included and more than a pair of leads 62 may provide electrical input across one or more of the initiators.

For each of the electrically operated propellant initiators 30 and 32, the respective pair of electrodes 36 couples the respective initiator to the respective pair of leads 62. Thus an electrode 34 or 35 of the respective a pair 36 is coupled between a lead 62 of the respective pair 36 and the respective initiator 30 or 32. Reference is now had in particular to the electrodes 34 and 35 coupled to the primary initiator 30, though discussion is similarly relevant to the pair of electrodes 36 coupled to the auxiliary initiator 32. The use of the electrodes 34 and 35 allows control of the particular location or portion of the respective initiator 30 that is ignited, the speed at which the initiator 30 burns, and even the intensity of the burn.

Location of burn may be controlled via location of the electrodes 34 and 35 relative to the respective electrically operated propellant layer 33. As depicted, the electrically operated propellant 33 of the primary initiator 30 is disposed between the electrodes 34 and 35, such as sandwiched between the electrodes 34 and 35. A first electrode 34 is disposed between the casing outlet 22 and the electrically operated propellant 33, while the second electrode 35 is disposed between the electrically operated propellant 33 and the primary propellant charge 24. It will be appreciated that the figures are not necessarily to scale, and thus thicknesses of the electrodes 34 and 35 and of the electrically operated propellant 33 are not necessarily to scale relative to one another, or relative to the propellant charges 24 and 26.

The electrodes 34 and 35 are disposed on opposing sides of the respective electrically operated propellant 33, such as being contiguous with the opposing outer surfaces of the electrically operated propellant 33. In other embodiments, the electrodes 34 and 35 may alternatively or additionally be embedded in the electrically operated propellant 33.

A majority, such as all, of the electrically operated propellant 33 is disposed between the respective electrodes 34 and 35, such that electrical input will flow between the electrodes 34 and 35 causing ignition and burning of a majority or all of the respective electrically operated propellant 33. In other embodiments, at least a portion of the electrically operated propellant may not be disposed between the respective pair of electrodes. This portion may be spaced far enough from the electrodes that the at least a portion of electrically operated propellant may not burn due to the lack of electrical input across the at least a portion of electrically operated propellant.

Location and intensity of a pulse may be further controlled via the shape and form of the electrodes 34 and 35. For instance, intensity and temperature of the burn may be greater adjacent an electrode providing a greater current density. If there is a large enough disparity between current density provided by the electrodes 34 and 35, burning, such as initial burning upon initiation of electrical input, may only take place adjacent the electrode providing the highest current density.

Figure 2A:
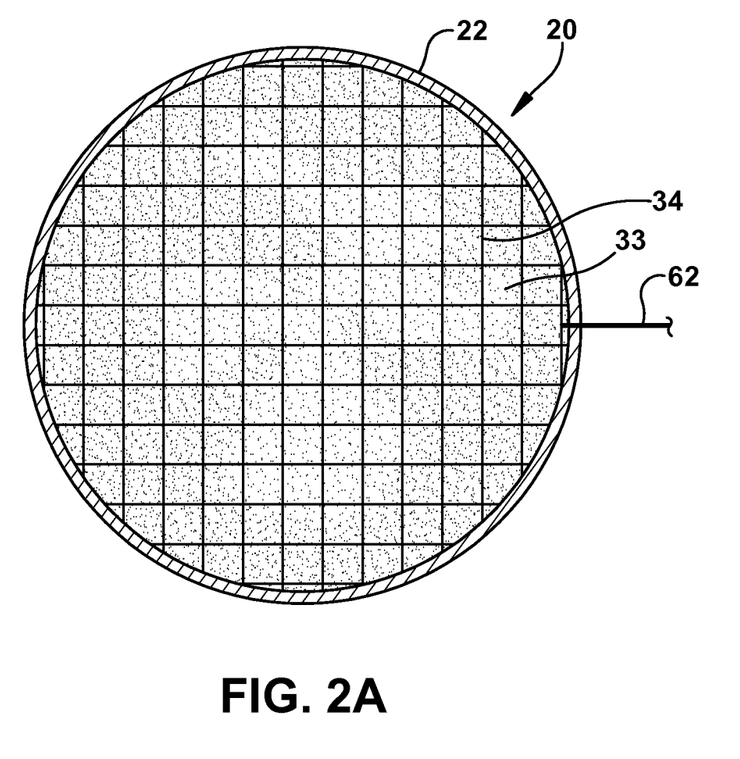
FIG. 2A is a schematic cross-sectional view of the gas generation system of FIG. 1, along line 2A-2A of FIG. 1.
Figure 2B:
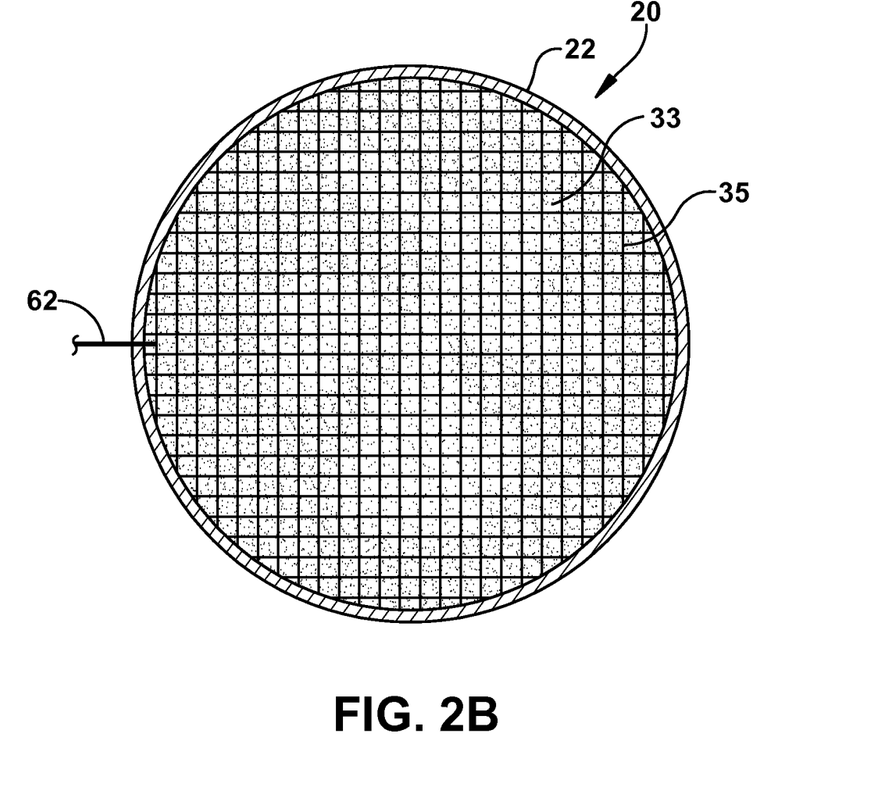
FIG. 2B is a schematic cross-sectional view of the gas generation system of FIG. 1, along line 2B-2B of FIG. 1.

As depicted in FIGS. 1, 2A and 2B, the electrodes 34 and 35 are mesh electrodes. Each electrode 34 and 35 covers a full opposing side of the electrically operated propellant 33, allowing electric current to move across the entirety of the electrically operated propellant 33. The depicted mesh is wire mesh having hole therethrough, such as being a crisscrossed wire mesh. The mesh prevents fluid separation between the respective propellant charge 24 and the electrically operated propellant 33 of the primary initiator 30, allowing for heat from a burning initiator 30 to efficiently cause ignition of the propellant charge 24. It will be appreciated that in other embodiments, one or both of a pair of electrodes may have other suitable shape and form.

In the depicted embodiment, initial burning takes place only adjacent the first electrode 35 that is a coarse mesh electrode, while initial burning does not take place at the second electrode 34 that is a fine mesh electrode. Once the electrically operated propellant 33 is ignited, burning will take place adjacent both electrodes 34 and 35. As used herein, current density is the electric current per unit area of cross section. When there is a disparity between current densities provided by the electrodes of a pair of electrodes, electrical input may be provided in one direction across the electrodes rather than in the opposite direction across the electrodes to vary the speed and intensity of the burn.

The electrical input may be controlled via a controller 68 controlling the timing and direction of electrical input across the electrically operated propellant initiators (e.g., the initiators 30 and 32) from the power source 60 via the use of a controller 68. The controller 68 may be any suitable device, such as a processor having an algorithm suitable for controlling the power source 60. The controller 68 may act autonomously or may be directed, such as wirelessly, via an operator.

Figure 3:
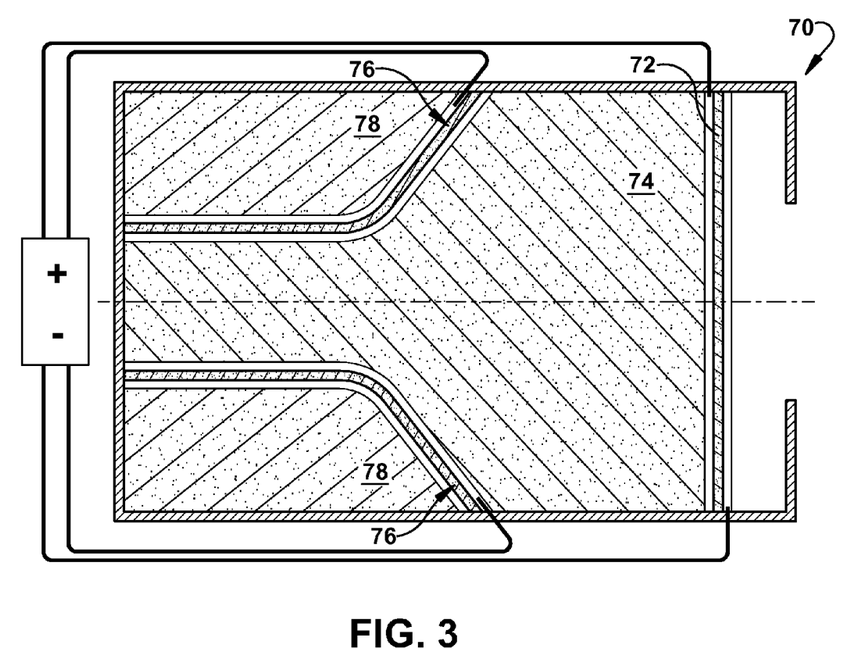
FIG. 3 is a schematic view of another embodiment of a gas generation system in accordance with the invention.
Figure 4:
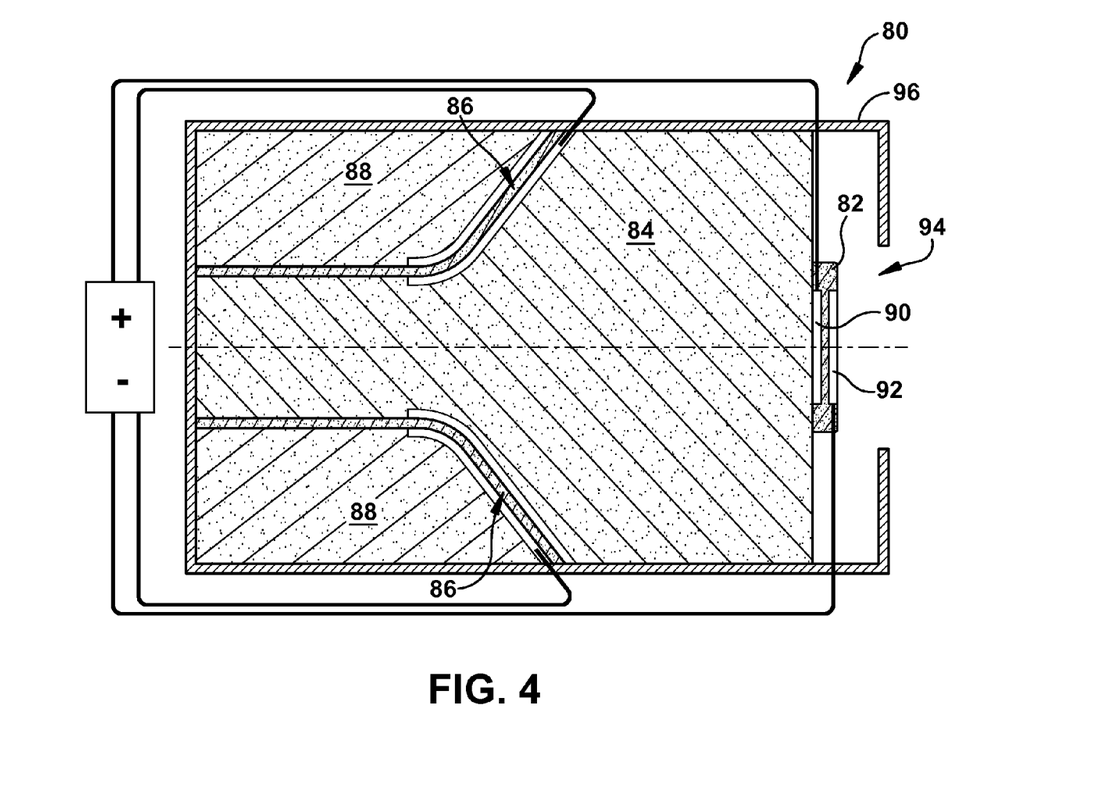
FIG. 4 is a schematic view of yet another embodiment of a gas generation system in accordance with the invention.

Turning now to FIGS. 3 and 4, additional embodiments of gas generations systems are shown in accordance with the present invention. The above discussion applies to the embodiments of FIGS. 3 and 4 except as otherwise differentiated.

FIG. 3 depicts a rocket motor 70 having a primary initiator 72, primary propellant charge 74, auxiliary initiator 76, and auxiliary propellant charge 78. The initiators 72 and 76 each include electrically operated propellant as described herein. The propellant charges 74 and 78 are illustrated in varying shapes that may be formed via casting or molding. Likewise, the auxiliary initiator 76 is also shown in varying shapes where the electrically operated propellant thereof may be formed via casting or molding. The shape of the electrically operated propellant of the auxiliary initiator 76 is possible via the combination of oxidizer, fuel, and binder forming the electrically operated propellant.

FIG. 4 depicts a rocket motor 80 having a primary initiator 82, primary propellant charge 84, auxiliary initiator 86, and auxiliary propellant charge 88. The initiators 82 and 86 each include electrically operated propellant as described herein. As shown, the electrodes 90 and 92 coupled to the primary initiator 82 are embedded in the electrically operated propellant of the primary initiator 82. The primary initiator 82 does not fluidly separate the primary propellant charge 84 from the opening 94 of the casing 96. Additionally, a portion of the electrically operated propellant 89 of the auxiliary initiator 86 is not disposed between the respective pair of electrodes 90 and 91, such that all of the electrically operated propellant 89 does not ignite when an electrical input is applied across the respective electrodes 90 and 91.

Figure 5:
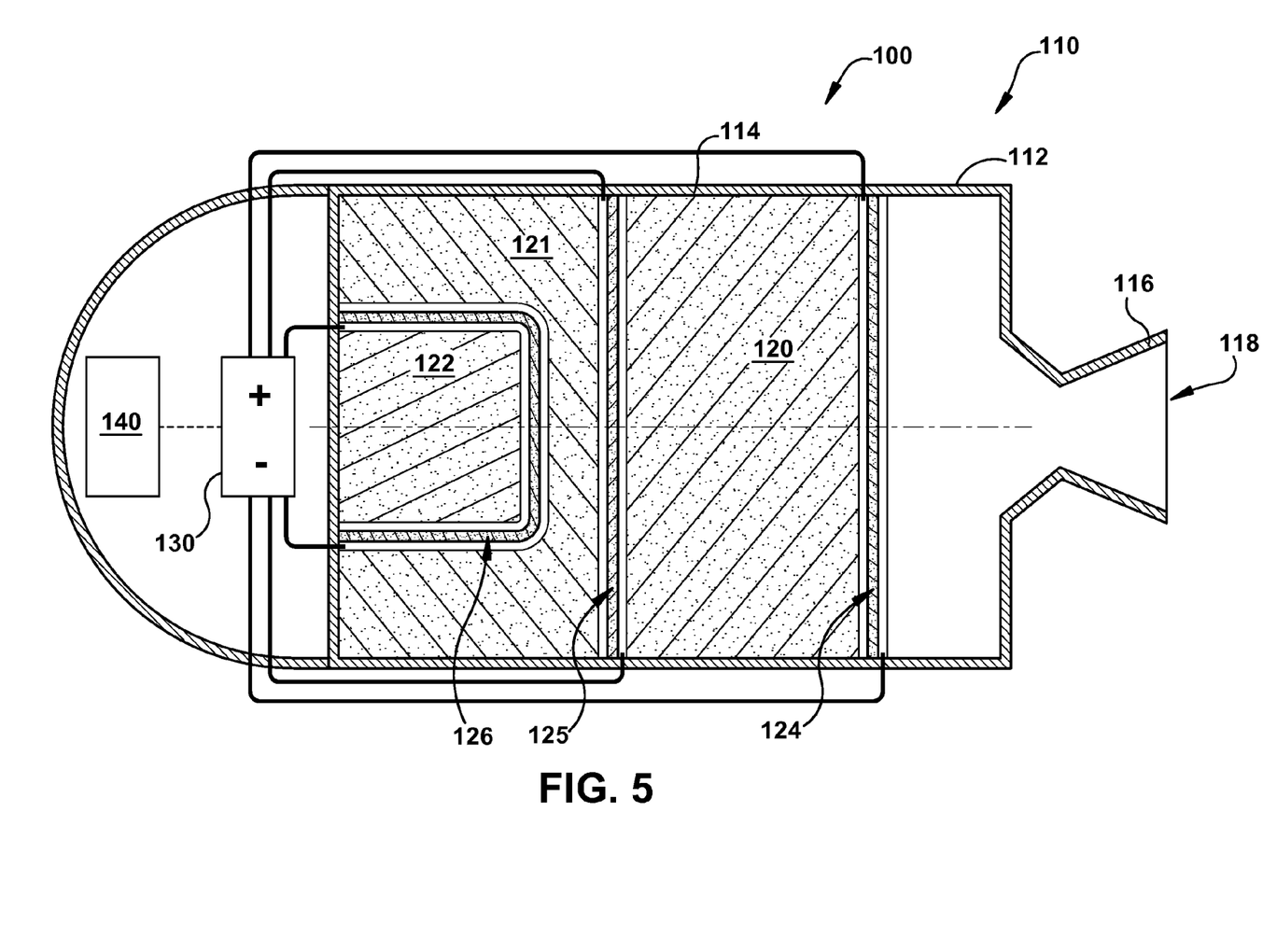
FIG. 5 is a schematic view of a projectile having a gas generation system in accordance with the invention.

Referring now to FIG. 5, a rocket motor 100, similar to the rocket motor 20, is provided as part of a projectile 110. The rocket motor 100 is provided for generating gases to drive movement of the projectile 110. The projectile 110 includes a body 112 that includes the casing 114 of the rocket motor 100. The body 112 further includes a nozzle 116 having a nozzle opening 118 adjacent the opening 120 of the casing 114, for directing propellant gases generated from the burning of the associated propellant charges 120, 121 and 122 and initiators 124, 125 and 126.

Similar to the rocket motor 20, the initiators 124, 125, and 126 of the rocket motor 100 are operatively coupled to respective of the propellant charges 120, 121 and 122, to initiate combustion in the propellant charges 120, 121 and 122. The propellant charges 120 and 121 are operatively isolated from one another, such as via the auxiliary initiator 125, and the propellant charges 121 and 122 are operatively isolated from one another, such as via the auxiliary initiator 126. In this way the propellant charges 120, 121 and 122 can be individually initiated.

Referring still to FIG. 5, the present invention also includes a method of propelling the projectile 110. The method includes the steps of (a) providing a first propulsion pulse by applying an electrical input across one of the electrically operated propellant initiators (e.g., the primary initiator 124) to initiate combustion of one of the propellant charges (e.g., the primary propellant charge 120); (b) maintaining isolation of other of the propellant charges (e.g., the auxiliary propellant charges 121 and 122) during the initiation of combustion of the one of the propellant charges (e.g., the primary propellant charge 120); and (c) providing a second propulsion pulse by applying an electrical input across another of the electrically operated propellant initiators (e.g., the auxiliary initiator 125 or 126) to initiate combustion of another of the propellant charges (e.g., the auxiliary propellant charge 121, 122 or both).

It will be appreciated that initiation of the auxiliary initiator 126 may cause combustion of both auxiliary propellant charges 121 and 122. On the other hand, initiation of auxiliary initiator 125 will cause combustion of only the auxiliary propellant charge 121, assuming the primary propellant charge 120 has already been exhausted. In such case, the method may further include the step of maintaining isolation of other of the propellant charges (e.g., the auxiliary propellant charge 122) during the initiation of combustion of the another of the propellant charges (e.g., the auxiliary propellant charge 121).

The method may further include the step of applying electrical input, such as from the power source 130 across the one or the another electrically operated propellant initiator (e.g., the initiator 124 or 125) in a direction from a first electrode to a second electrode, the first and second electrodes being coupled between the power source 130 and the respective initiator, and the first electrode providing a greater current density than the second electrode. The method may further include the step of applying electrical input across the one or the another electrically operated propellant initiator (e.g., the initiator 124 or 125) in a direction from a second electrode to a first electrode, the first and second electrodes being coupled between the power source 130 and the respective initiator, and the first electrode providing a greater current density than the second electrode.

The method may further include the step of extinguishing the one or the another electrically operated propellant initiator (e.g., the initiator 124 or 125) via stopping the application of electrical current across the respective initiator. Depending on when the electrical current is stopped, or on the location of the respective electrodes contacting the respective initiator, the method may even further include the step of only igniting less than 75% of the one or the another electrically operated propellant initiator (e.g., the respective initiator 124 or 125) to produce the respective propulsion pulse.

The method may further include the step of using the single power source 130 to provide the electrical input for the ignition of each of the electrically operated propellant initiators (e.g., the initiators 124, 125 and 126). The method may also include the step of controlling the timing and direction of electrical input across the electrically operated propellant initiators (e.g., the initiators 124, 125, and 126) from the power source 130 via the use of a controller 140. The controller 140 may be any suitable device, such as a processor having an algorithm suitable for controlling the power source 130. The controller 140 may act autonomously or may be directed, such as wirelessly, via an operator.

In summary, the present invention provides a rocket motor 20, 100 for generating gases, such as for use in propelling a projectile 110. The rocket motor 20, 100 includes two or more propellant charges 24, 26, 120, 121 and 122 and electrically operated propellant initiators 30, 32, 124, 125 and 126 operatively coupled to respective of the propellant charges 24, 26, 120, 121 and 122, to initiate combustion in the propellant charges 24, 26, 120, 121 and 122. The propellant charges 24, 26, 120, 121 and 122 are operatively isolated from one another such that the propellant charges 24, 26, 120, 121 and 122 can be individually initiated and are not ignited due to gases generated from other of the propellant charges 24, 26, 120, 121 and 122 being combusted.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, stores, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A gas generation system, comprising:
   two or more propellant charges; and
   an electrically operated propellant initiator operatively coupled to a first propellant charge of the two or more propellant charges, to initiate combustion in the first propellant charge,
   wherein the electrically operated propellant initiator has a pair of electrodes and a respective electrically operated propellant that is disposed between the respective pair of electrodes, and
   wherein the first propellant charge is operatively isolated from a second propellant charge of the two or more propellant charges via the electrically operated propellant initiator such that the first propellant charge can be individually initiated from the second propellant charge.

2. A gas generation system according to claim 1, wherein the electrically operated propellant initiator has electrically operated propellant that is configured to transition from an unignited state to an ignited state when electrical input is applied across the electrically operated propellant initiator and is configured to maintain the unignited state when the electrical input is not applied.

3. A gas generation system according to claim 2, wherein the electrically operated propellant of the electrically operated propellant initiator is configured to transition from the ignited state to the unignited state when exposed to pressure greater than 200 psi and the electrical input is not applied.

4. A gas generation system according to claim 1, wherein the electrically operated propellant initiator is positioned contiguous with an external surface of the first propellant charge to initiate combustion of the first propellant charge.

5. A gas generation system according to claim 1, wherein the electrodes of at the electrically operated propellant initiator are mesh electrodes.

6. A gas generation system according to claim 1, wherein a portion of the electrically operated propellant of at least one of the electrically operated propellant initiators is not disposed between the respective pair of electrodes such that all of the electrically operated propellant does not ignite when an electrical input is applied across the respective pair of electrodes.

7. A gas generation system according to claim 1, further including one or more power sources and a pair of leads extending from the one or more power sources to each of the electrically operated propellant initiators.

8. A gas generation system according to claim 1, wherein the electrically operated propellant initiator includes
the electrically operated propellant having a pair of opposing sides,
wherein each electrode of the pair of electrodes extends along one side of the pair of opposing sides such that the respective electrically operated propellant is disposed between the pair of electrodes, and wherein one electrode of the pair of electrodes is disposed between the electrically operated propellant and the first propellant charge.

9. A gas generation system according to claim 1,
wherein the two or more propellant charges include a third propellant charge and a fourth propellant charge that each include a respective electrically operated propellant initiator operatively coupled thereto to initiate combustion in the respective of the third propellant charge and the fourth propellant charge, and
wherein each of the third propellant charge and the fourth propellant charge is operatively isolated from at least one of the other of the third propellant charge and the fourth propellant charge, the first propellant charge, the second propellant charge, or another of the two or more propellant charges via the respective electrically operated propellant initiator operatively coupled thereto such that each of the third propellant charge and the fourth propellant charge can be individually initiated from the at least one of the other of the third propellant charge and the fourth propellant charge, the first propellant charge, the second propellant charge, or another of the two or more propellant charges.

10. A gas generation system according to claim 1, wherein one electrode of the pair of electrodes provides a greater current density than the other electrode of the pair of electrodes.

11. A gas generation system according to claim 1, wherein the mass of electrically-operated propellant is less than half of the mass of the first propellant charge.

12. A projectile including a gas generation system according to claim 1, the gas generation system for driving movement of the projectile.

13. A method of propelling a projectile including the gas generation system of claim 1, the method including the steps of:
providing a first propulsion pulse by igniting the second propellant charge;
maintaining operative isolation of the first propellant charge from the second propellant charge during the combustion of the second propellant charge via the electrically operated propellant initiator; and
providing a second propulsion pulse by applying an electrical input across the electrically operated propellant initiator to initiate combustion of the first propellant charge.

14. The method of claim 13, further including the step of extinguishing the electrically operated propellant initiator via stopping the application of electrical current across the electrically operated propellant initiator.

15. A gas generation system, comprising:
two or more propellant charges; and
an electrically operated propellant initiator operatively coupled to a first propellant charge of the two or more propellant charges, to initiate combustion in the first propellant charge,
wherein the first propellant charge and a second propellant charge of the two or more propellant charges are operatively isolated from one another via the electrically operated propellant initiator such that the first propellant charges and the second propellant charge can be individually initiated, and wherein the first propellant charges and the second propellant charge are configured to be non-initiable in response to an electrical charge, and
wherein the electrically operated propellant initiator has a pair of electrodes and a respective electrically operated propellant that is disposed between the respective pair of electrodes.

16. A gas generation system according to claim 15, wherein the electrically operated propellant is configured to transition from an unignited state to an ignited state when electrical input is applied across the electrically operated propellant initiator and is configured to maintain the unignited state when the electrical input is not applied.

17. A gas generation system according to claim 15, wherein the electrically operated propellant is configured to transition from the ignited state to the unignited state when exposed to pressure greater than 200 psi and the electrical input is not applied.

18. A gas generation system according to claim 15, wherein the electrodes of the electrically operated propellant initiator are mesh electrodes.

19. A projectile including a gas generation system according to claim 15, the gas generation system for driving movement of the projectile.

* * * * *